United States Patent [19]
Frank et al.

[11] Patent Number: 5,991,646
[45] Date of Patent: Nov. 23, 1999

[54] ARTICULATING SPEAKER AND MICROPHONE FOR A WIRELESS TELEPHONE WITH CIGARETTE LIGHTER ADAPTER

[75] Inventors: Christopher L. Frank, Emeryville; Eric Geruldsen, San Diego, both of Calif.

[73] Assignees: Sony Corporation, Tokyo, Japan; Sony Electronics, Inc., Park Ridge, N.J.

[21] Appl. No.: 08/946,697

[22] Filed: Oct. 8, 1997

[51] Int. Cl.$^6$ ....................................... H04B 1/38
[52] U.S. Cl. .............................. 455/569; 455/575; 455/90; 379/388; 381/363
[58] Field of Search ....................... 455/569, 572, 455/90, 345, 346, 350; 379/388; 381/363

[56] References Cited

U.S. PATENT DOCUMENTS

| | | | |
|---|---|---|---|
| 5,642,402 | 6/1997 | Vilmi et al. | 455/569 |
| 5,732,361 | 5/1998 | Liu | 455/569 |
| 5,749,057 | 5/1998 | Takagi | 455/569 |
| 5,754,962 | 5/1998 | Griffin | 455/569 |
| 5,794,163 | 8/1998 | Paterson et al. | 455/569 |
| 5,802,167 | 9/1998 | Hong | 455/569 |

*Primary Examiner*—Paul Loomis
*Attorney, Agent, or Firm*—Ronald P. Kananen; Rader, Fishman & Grauer

[57] ABSTRACT

A speaker and microphone are provided on and supported by an articulating extension. The extension comprises a cigarette lighter adapter which is plugged into a cigarette lighter to provide power for the speaker and microphone. The speaker and microphone are connected to a wireless telephone such that the speaker and microphone can be used to place a call with the telephone in a hands free manner. The extension articulates to optimally orient the speaker and microphone with respect to the user.

20 Claims, 7 Drawing Sheets

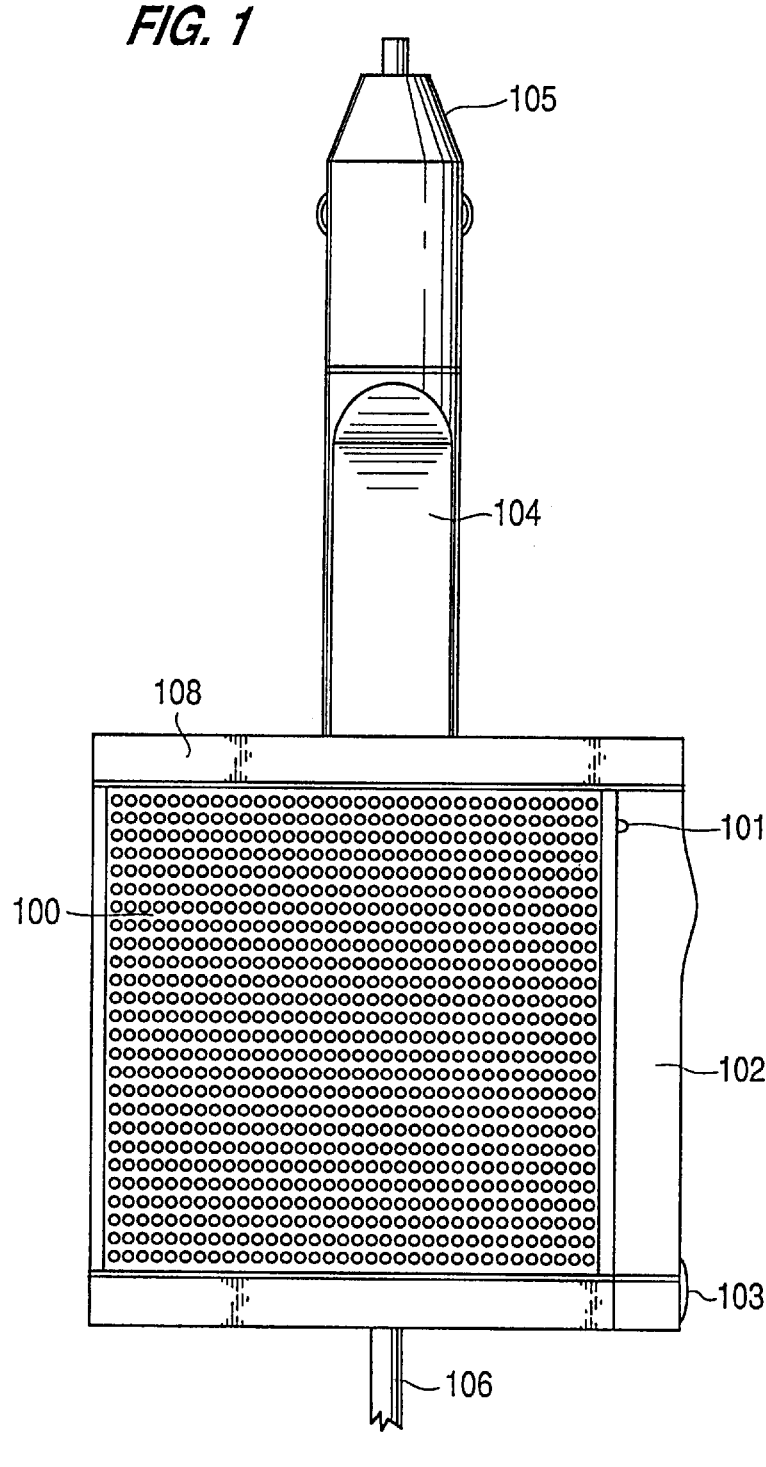
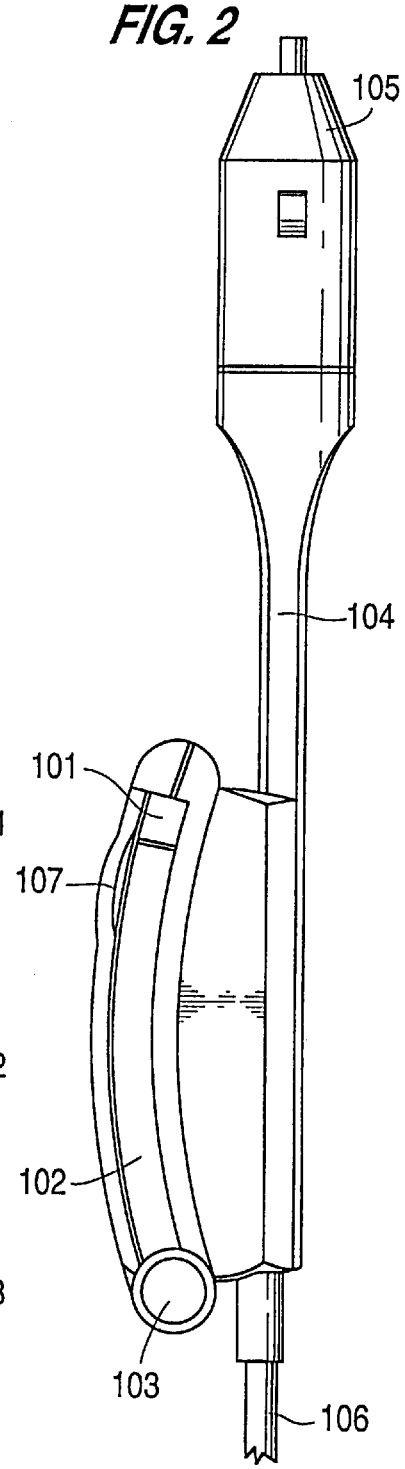
FIG. 1
FIG. 2

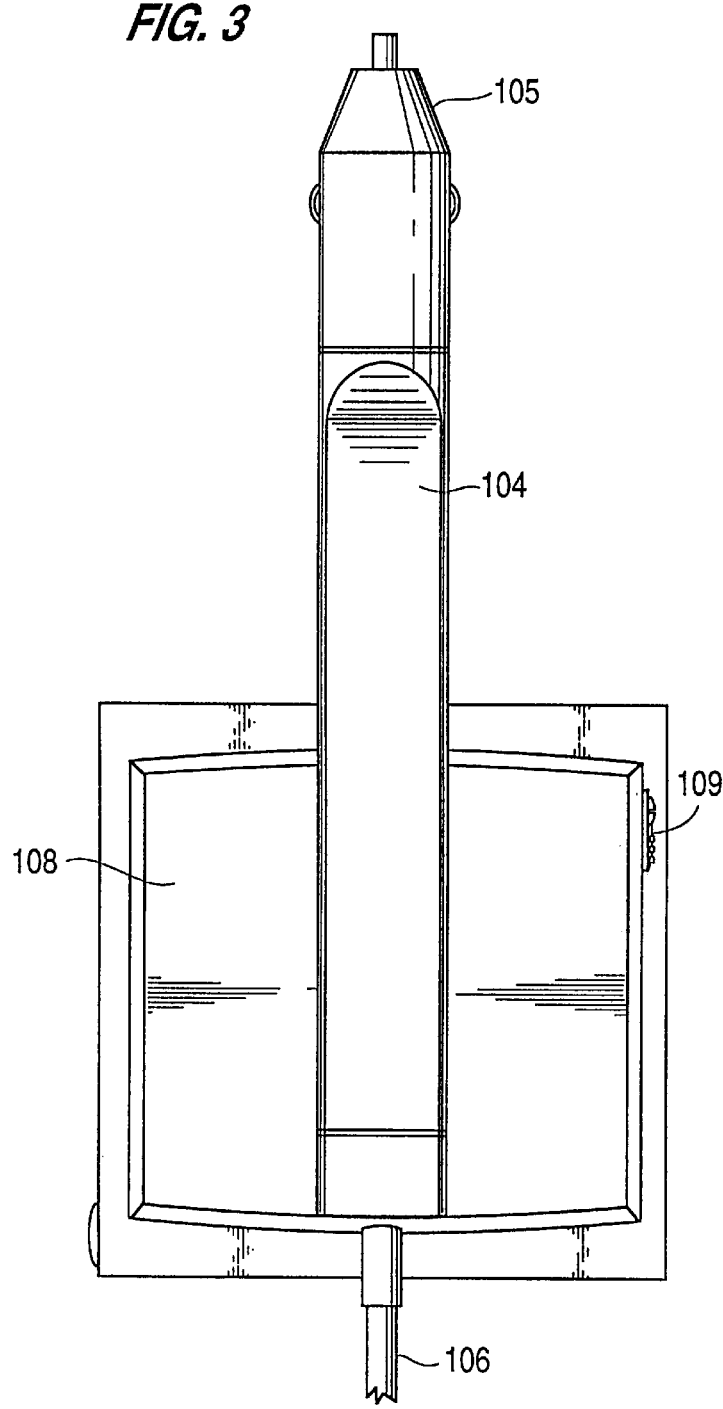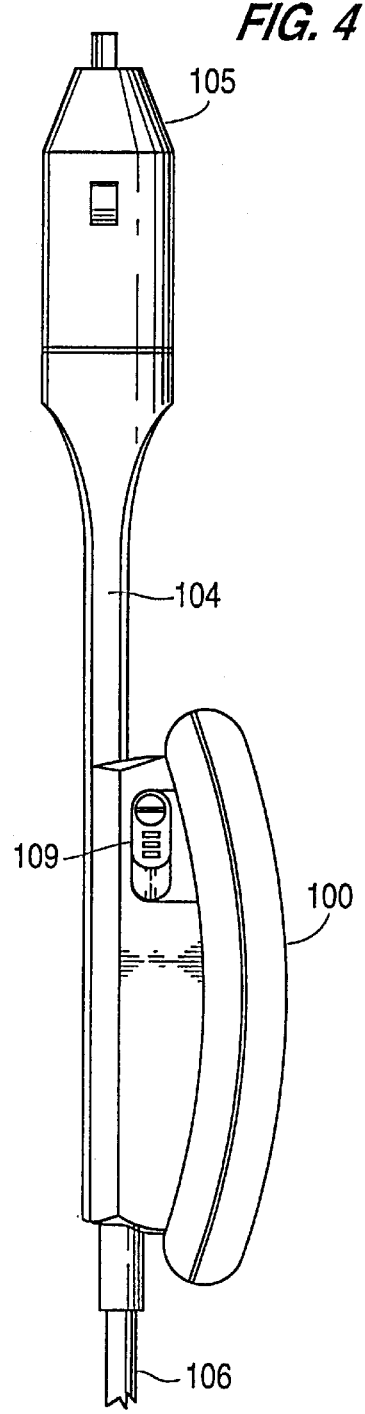

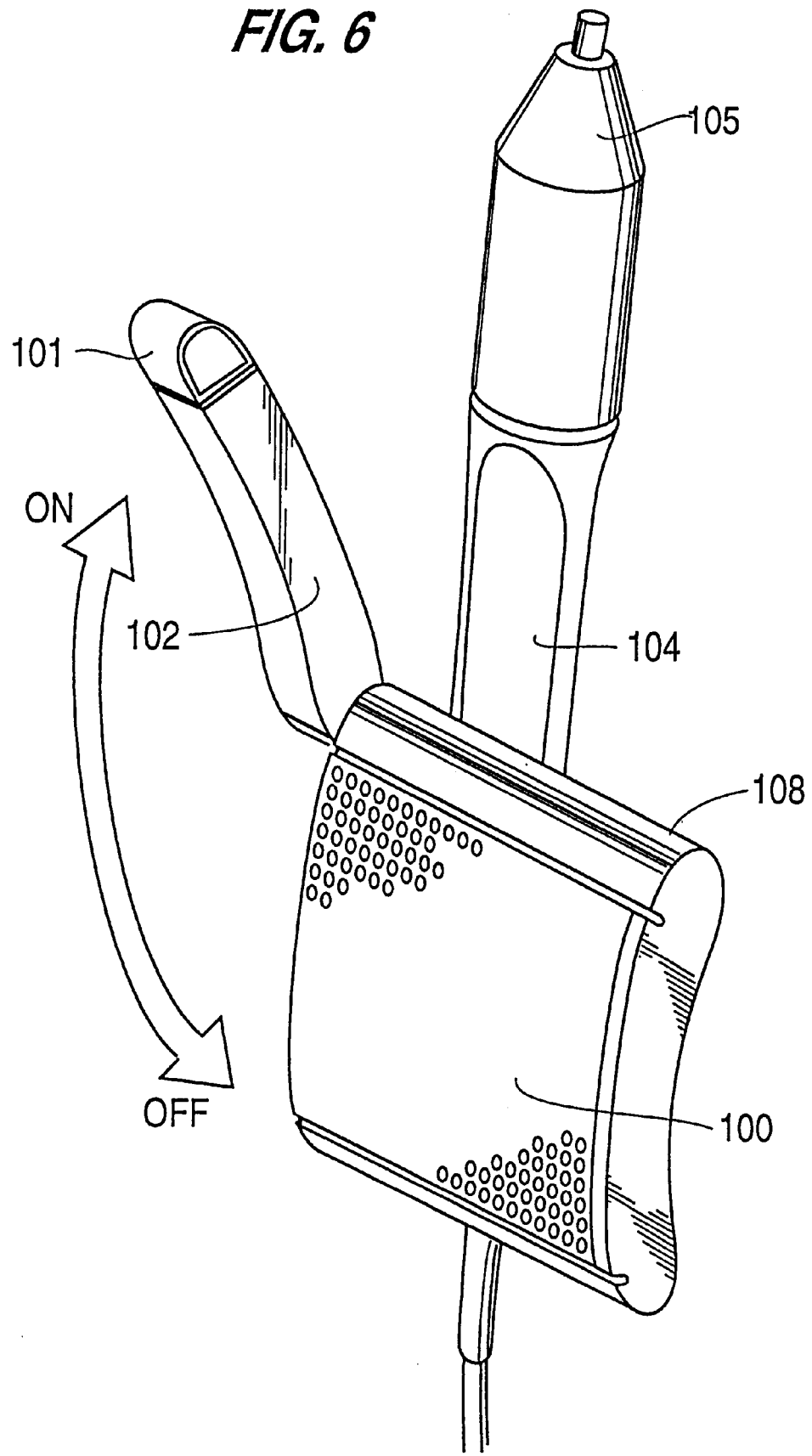

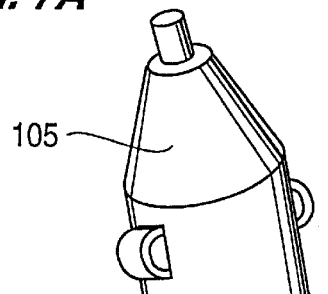
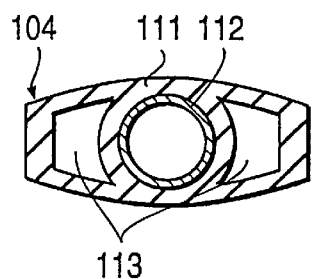
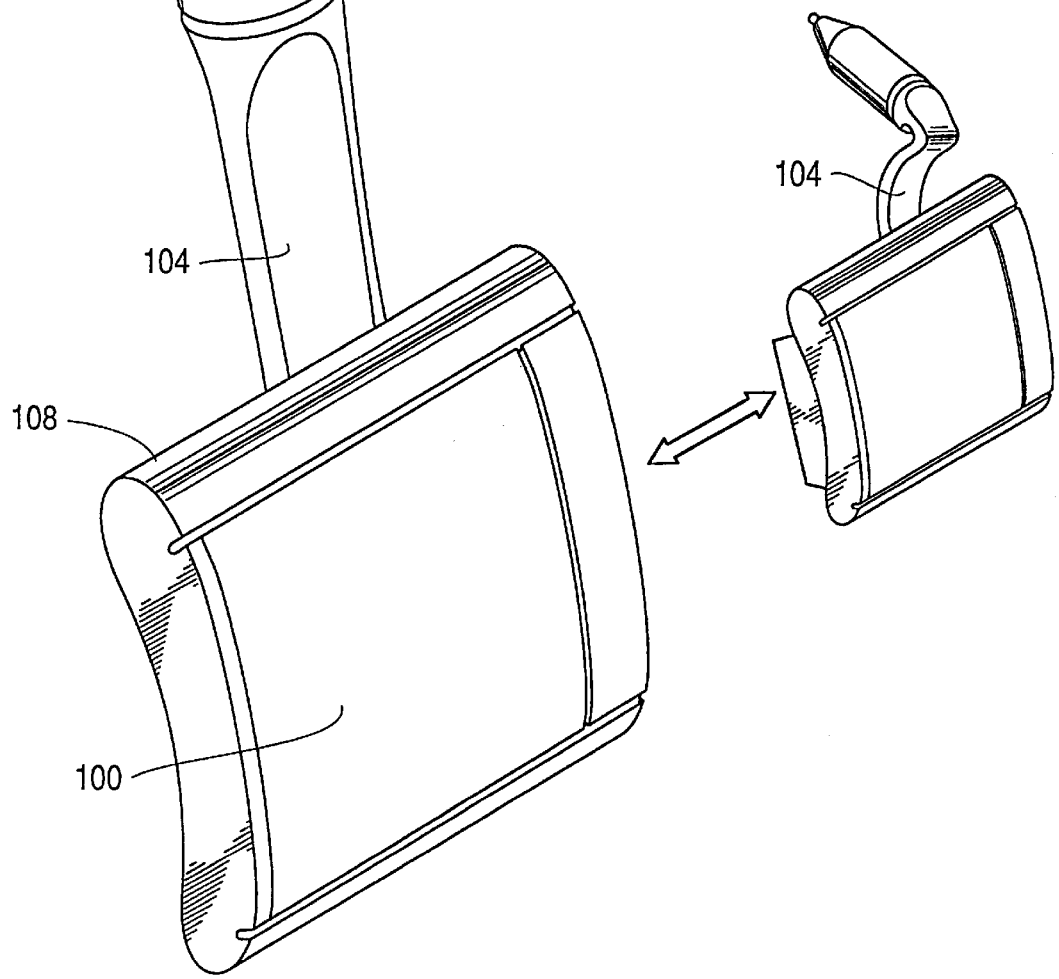

ARTICULATING SPEAKER AND MICROPHONE FOR A WIRELESS TELEPHONE WITH CIGARETTE LIGHTER ADAPTER

FIELD OF THE INVENTION

The present invention relates to the field of wireless telephony. More particularly, the present invention relates to an articulating speaker and microphone to be used with a wireless telephone in a hands-free manner, the speaker and microphone being provided on a cigarette lighter adapter.

BACKGROUND OF THE INVENTION

Since their introduction, wireless communication systems including pagers, cellular telephones and low-tier radio telephones, have become increasingly popular. Such devices provide an extremely convenient means for communication.

Wireless telephone systems, for example, cellular telephones and low-tier radio telephones, are convenient because they allow their users to save time. The user of a wireless telephone unit need not waste time looking for an available telephone in order to place a call.

Perhaps more importantly, a wireless telephone unit allows its user to take advantage of time spent traveling. For example, with a wireless telephone, the user can be transacting business or making appointments while riding in a vehicle, walking down the street, or driving a car.

Another useful advance in the field of telephony is the invention of the speaker-phone. With a speaker-phone unit, the user speaks his or her comments aloud. The speaker-phone incorporates a relatively sensitive microphone, apart from the microphone in the handset, which transduces the user's comments. The speaker-phone then transmits those comments over the phone line in the conventional manner. Comments made by the other party to the phone call are produced by a speaker incorporated into the speaker-phone. In this manner, the user of a speakerphone has his or her hands free for other activities such as typing, note taking, etc. while engaging in the phone call. Speaker-phone units are now commonly used both at home and in the office.

As noted above, to maximize the advantages offered by a wireless telephone unit, the wireless unit should be useable while traveling, particularly while driving. As a user's hands are required for safe driving, it would be advantageous if a wireless telephone unit could be operated as a mobile speaker-phone. Accordingly, there is a need in the art for a method and apparatus of using a wireless telephone as a mobile speaker-phone while driving an automobile, and a need for a method of manufacturing the same.

SUMMARY OF THE INVENTION

It is an object of the present invention to meet the above-described needs and others. Specifically, it is an object of the present invention to provide a unit which can be used with a wireless telephone in a hands free manner. Other objects and advantages of the present invention may be identified by reading the following detailed description, practicing the invention, or considering the appended claims.

To achieve these objects and others, an exemplary embodiment of the present invention may include: a speaker; a microphone; a power source for powering the speaker and microphone; and an electrical connector for connecting a wireless telephone to the speaker and microphone.

The microphone may be disposed on a microphone arm which is rotatably attached to the unit. This allows the microphone to be brought closer to the face of the user and optimally oriented for use by the user.

The speaker and microphone may be supported on and oriented by an articulating extension. This extension articulates, i.e., adjusts to and retains a shape given it by the user, to allow the microphone and speaker to be optimally positioned and oriented with respect to the user. The articulating extension may also incorporate a cigarette lighter adapter which can be plugged into a cigarette lighter to power the speaker and microphone. The articulating extension may be encased in rubber.

Finally, the unit may comprise a volume control for the speaker and a finger catch for manipulating the microphone arm.

The present invention also encompasses a method of using a wireless telephone which includes: connecting the wireless telephone to a speaker and a microphone; and providing a power source, independent of the wireless telephone, for the speaker and microphone. This method may also include using the speaker and microphone to conduct a telephone call with the wireless telephone.

If the speaker and microphone are supported on an articulating extension, the method may include articulating the articulating extension to place and orient the speaker and microphone. If the microphone is mounted on a moving microphone arm, the method may include moving the microphone arm to place and orient the microphone.

The method may also include, as part of providing a power source, connecting a cigarette lighter adapter to a cigarette lighter. The cigarette lighter adapter is connected to and provides power for the speaker and microphone.

The present invention also encompasses a method of making a unit for use with a wireless telephone which includes providing a speaker; providing a microphone; and providing an electrical connector for connecting the speaker and microphone to the wireless telephone unit.

This method may also include any of the following: mounting the speaker and microphone on an articulating extension; providing a cigarette lighter adapter on an end of the articulating extension for providing power to the speaker and microphone; encasing the articulating extension in rubber; and mounting the microphone on a movable microphone arm.

BRIEF DESCRIPTION OF THE DRAWINGS

The accompanying drawings illustrate the present invention and are a part of the specification. Together with the following description, the drawings demonstrate and explain the principles of the present invention. In the drawings:

FIG. 1 illustrates a front view of the articulating speaker and microphone of the present invention.

FIG. 2 illustrates a right side view of the articulating speaker and microphone of the present invention.

FIG. 3 illustrates a rear view of the articulating speaker and microphone of the present invention.

FIG. 4 illustrates a left side view of the articulating speaker and microphone of the present invention.

FIG. 6 illustrates a front view of the articulating speaker and microphone of the present invention with a microphone arm extended.

FIG. 7 illustrates a front view of the articulating speaker and microphone of the present invention with an enlarged cross-sectional view of the articulating power cord.

DETAILED DESCRIPTION OF THE PREFERRED EMBODIMENTS

Figure 5:
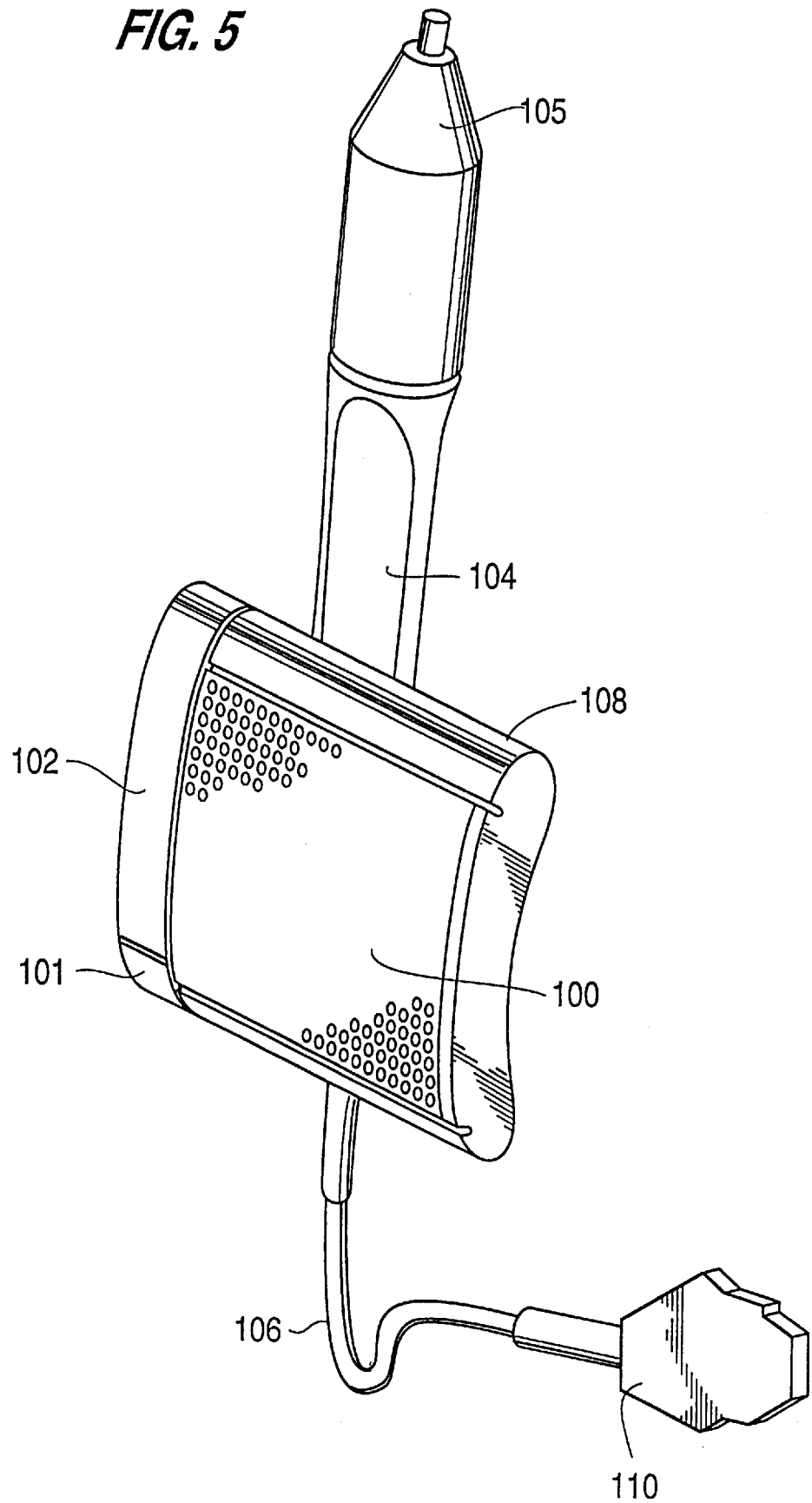
FIG. 5 illustrates a front view of the articulating speaker and microphone of the present invention including a cord and connector for connecting to a wireless telephone unit.

Using the drawings, the preferred embodiments of the present invention will now be explained.

As shown in FIG. 1, the articulating speaker and microphone of the present invention includes a speaker 100 enclosed in a casing 108. Associated with the speaker 100 is a microphone 101. The microphone 101 is preferably disposed at the end of a microphone arm 102. The microphone arm 102 is attached to the casing 108 with a hinge 103 about which the arm 102 may be rotated.

The speaker 100 and microphone 101 are connected to a wireless telephone unit (not shown) by the cable 106. At the end of the cable 106 is a connector (See FIG. 5) which connects to a port of a wireless telephone unit. When the speaker 100 and microphone 101 are connected by cable 106 to a wireless telephone unit, the wireless telephone unit may be manually or automatically switched into a "speaker-phone" mode.

In this speaker-phone mode, the wireless telephone unit will transduce a user's spoken comments with the microphone 101 and transmit those comments wirelessly in the conventional manner. The wireless telephone unit will also transmit comments received from the other party to the telephone call to the speaker 100 where the comments will be made audible to the user. In this way, the user may conduct a telephone call using his or her wireless telephone unit while leaving his or her hands free for other tasks, e.g. driving an automobile.

A problem arises in powering the relatively powerful speaker 100 and microphone 101. The battery of the wireless telephone unit would be quickly depleted if required to provide power to the speaker 100 and microphone 101. Accordingly, a cigarette lighter adapter 105 is provided. Using a well-known method, the adapter 105 converts the heat generated by a cigarette lighter in an automobile into an electrical current that can be used to power the speaker 100 and microphone 101.

The adapter 105 is connected to the housing 108 with an articulating, semi-rigid extension 104 which incorporates a power cord connecting the adapter 105 to the speaker 100 and microphone 101. Due to the conventional placement of an automobile cigarette lighter on the automobile dashboard, it is convenient to have the housing 108, speaker 100 and microphone 101 supported by the articulating extension 104 and the cigarette lighter adapter 105. In this way, the speaker 100 and microphone 101 are suspended from the dash or console of the automobile relatively near the face of the user.

Further, the speaker 100 and microphone 101 are secured relative to the automobile by attachment to the dashboard or console via the semi-rigid extension 104 and adapter 105. This prevents the unit from moving or sliding away from the user as the automobile makes turns as would be the case if the unit were merely resting on the dash or passenger seat of the automobile.

While supporting the housing 108, speaker 100 and microphone 101, the semi-rigid extension 104 is also articu-lating. "Articulating" as used herein means that the extension 104 may be bent or twisted and will retain that bent, twisted form. In other words, the articulating extension 104 is constructed such that once it has been bent and/or twisted to reorient the speaker 100 and microphone 101, it will retain that shape and maintain the placement of the speaker 100 and microphone 101 until again reshaped by the user. Accordingly, the extension 104 may be articulated to move the speaker 100 and microphone 101 closer to the user. The extension 104 may also be articulated to optimally orient the speaker 100 and microphone 101 toward the user.

To perform as required, the extension 104 may be constructed in any of several ways including use of a continuous ductile metal tubing or a flexible conduit made up of a series of linkages which can be bent or twisted and will retain the resulting shape until moved again. Such supportive, flexible devices are commonly used to support and orient light sources in, for example, desk lamps. Preferably, the extension 104 is encased in a layer of flexible rubber.

FIG. 2 shows a right side view of an embodiment of the present invention. As can be more clearly seen in FIG. 2, the microphone 101 is supported at the end of a microphone arm 102. The microphone arm 102 rotates in the plane of the page of FIG. 2 about hinge 103 to bring the microphone 101 closer to the user. A finger catch 107 may be formed on the microphone arm 102 so that the user may more easily catch and pull the microphone arm 102 away from the casing 108.

FIG. 3 shows a rear view of this embodiment of the present invention. As shown in FIG. 3, and more clearly in the left side view of FIG. 4, the casing 108 may include a volume switch or dial 109 to control the volume of the speaker 100.

FIG. 5 illustrates another view of this embodiment of the present invention which includes the cord 106 and an electrical connector 110 for connected the speaker 100 and microphone 101 to a wireless telephone unit (not shown).

FIG. 5 also illustrates that the microphone 101 may be disposed an either the top or bottom of the microphone arm 102 relative to the power cord 104. If the microphone 101 is disposed at the lower end of the arm 102, as shown in FIG. 5, the arm 102 can bring the microphone 101 closer to the face of the user.

FIG. 6 illustrates the microphone arm 102, as oriented and hinged in FIG. 5, in an extended position. The microphone 101 may be constructed so that when the arm 102 is moved away from the casing 108, the microphone 101 is automatically powered. Conversely, the microphone 101 may be automatically switched off when the arm 102 is in a folded position as illustrated in FIG. 5.

FIG. 7 contains first and second views of this embodiment of the present invention. In the first view, the semi-rigid, articulating extension 104 is straight. In the second view, the extension 104 has been bent into an s-shaped configuration so as to better orient the speaker and microphone toward a user.

FIG. 7 also includes an enlarged cross-sectional view of the extension 104. As mentioned above, the extension 104 contains a flexible conduit 112 which may be made of, for example, ductile metal tubing or a series of inter-connected linkages. The conduit 112 is preferably encased in a rubber casing 11 which may have wings 113 on either side to allow it to be more easily grasped and manipulated by a user.

Figure 8:
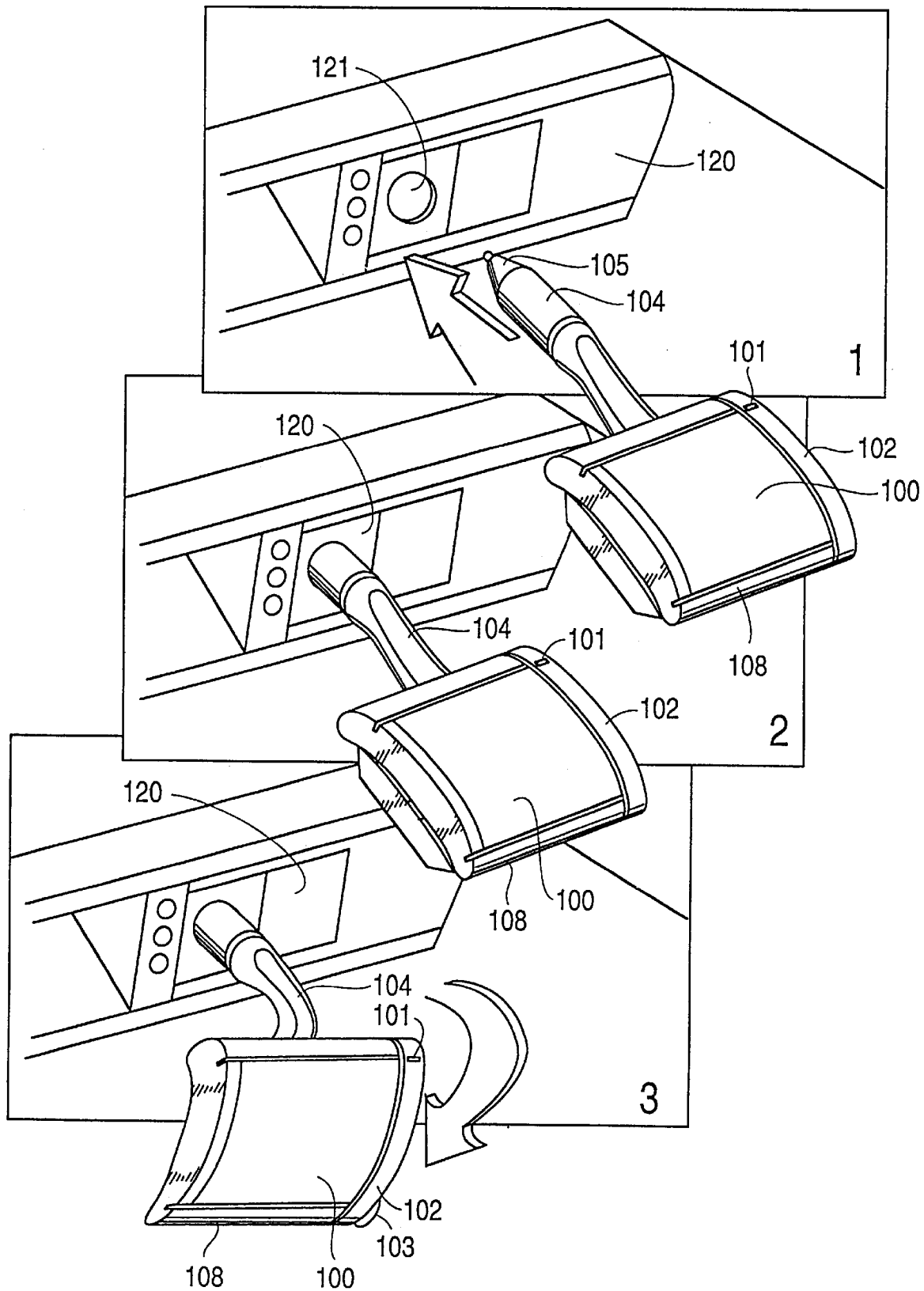
FIG. 8 shows a series of views of the articulating speaker and microphone of the present invention as it is articulated.

Finally, FIG. 8 shows a series of three views of this embodiment of the present invention in which the invention is successively, inserted into a cigarette lighter 121 of the dashboard 120 of an automobile and then articulated to a desired position which optimally orients the speaker 100 and microphone 101 toward a user.

Figure 9:
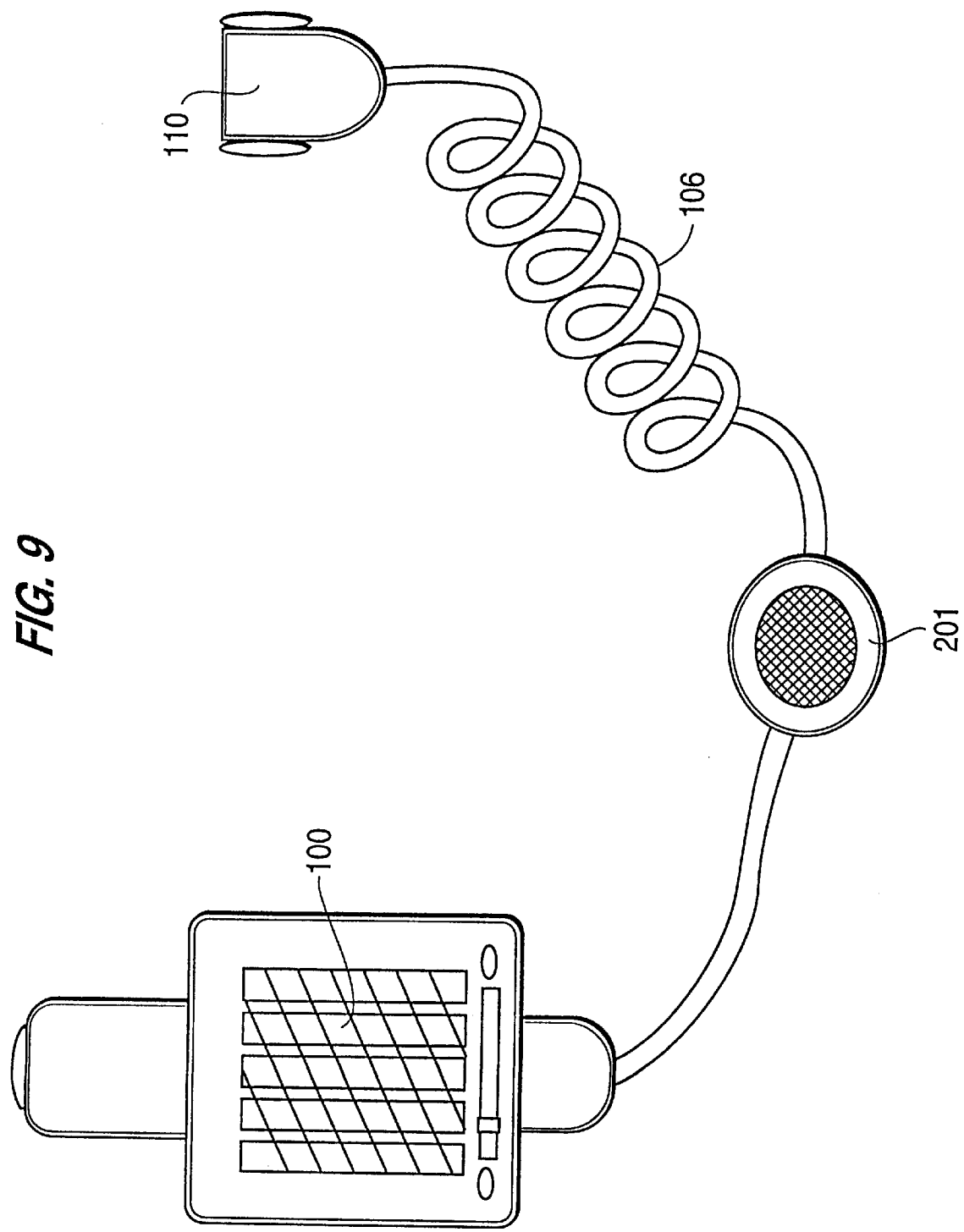
FIG. 9 illustrates an alternative embodiment of the present invention.

FIG. 9 illustrates an alternative embodiment of the present invention in which a microphone 201 is located along the cord 106 between the speaker 100 and the electrical connector 110 for connecting to a wireless telephone unit.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A unit for use with a wireless telephone comprising:

a speaker;

a microphone;

a power source for powering said speaker and microphone;

an articulating arm on which said speaker is mounted for supporting and orienting said speaker in a particular position for use by a user; and an electrical connector for connecting said wireless telephone and said speaker and microphone.

2. A unit as claimed in claim 1, further comprising a microphone arm having said microphone disposed thereon, said microphone arm being rotatably attached to said unit.

3. A unit as claimed in claim 1, wherein said power source comprises a cigarette lighter adapter which is disposed at an end of said articulating arm, wherein said articulating arm supports said microphone and said speaker an a position extended from an automobile dash board when said cigarette lighter adapter is plugged into a cigarette lighter in said dash board.

4. A unit as claimed in claim 1, wherein said articulating arm is encased in rubber.

5. A unit as claimed in claim 1, wherein said power source comprises a cigarette lighter adapter.

6. A unit as claimed in claim 1, further comprising a volume control for said speaker.

7. A unit as claimed in claim 2, said microphone arm further comprising a finger catch.

8. A method of using a wireless telephone comprising:

supporting a microphone and speaker on an articulating arm which holds said speaker and microphone in a particular orientation for use by a user;

connecting said wireless telephone to said speaker and microphone; and providing a power source, independent of said wireless telephone, for said speaker and microphone.

9. A method as claimed in claim 8, further comprising using said speaker and microphone to conduct a telephone call with said wireless telephone.

10. A method as claimed in claim 8, further comprising articulating said articulating arm to place and orient said speaker and microphone.

11. A method as claimed in claim 8, wherein said microphone is mounted on a moving microphone arm, the method further comprising, moving said microphone arm to place and orient said microphone.

12. A method as claimed in claim 8, wherein said providing a power source comprises connecting a cigarette lighter adapter to a cigarette lighter, said cigarette lighter adapter being connected to said speaker and microphone.

13. A method of making a unit for use with a wireless telephone comprising mounting a speaker and a microphone on an articulating arm capable of supporting said speaker and microphone in a particular orientation for use by a user, wherein an electrical connector for connecting said speaker and microphone to said wireless telephone unit is also provide with said articulating arm.

14. A method as claimed in claim 13, further comprising mounting said microphone on a movable microphone arm.

15. A method as claimed in claim 13, further comprising providing a cigarette lighter adapter on an end of said articulating arm for providing power to said speaker and microphone.

16. A method as claimed in claim 15, further comprising encasing said articulating arm in rubber.

17. A unit as claimed in claim 1, wherein said articulating arm comprises a continuous ductile metal tubing.

18. A unit as claimed in claim 1, wherein said articulating arm comprises a series of inter-connected linkages which can be bent or twisted and will retain a resulting shape.

19. A unit as claimed in claim 1, wherein said microphone is supported on and oriented by said articulating arm in common with said speaker.

20. A unit as claimed in claim 1, wherein said electrical connector comprises an electrical cable for connecting said wireless telephone and said speaker and microphone, wherein said microphone is integrally incorporated into said electrical cable along a length of said electrical cable.

\* \* \* \* \*